(12) United States Patent
Rivard et al.

(10) Patent No.: US 7,331,002 B2
(45) Date of Patent: Feb. 12, 2008

(54) NAVIGATING BREAKPOINTS IN A PROGRAM IN A DEBUGGING MODE

(75) Inventors: Dennis Rivard, Atkinson, NH (US); Eric Walker, Lancaster, MA (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 10/872,082

(22) Filed: Jun. 17, 2004

(65) Prior Publication Data

US 2005/0283674 A1  Dec. 22, 2005

(51) Int. Cl.
G06F 11/00 (2006.01)
G06F 9/46 (2006.01)

(52) U.S. Cl. .......................... 714/35; 714/38; 714/46; 717/129; 717/135

(58) Field of Classification Search ................ 717/129, 717/134, 135; 714/34, 38, 46, 39, 35
See application file for complete search history.

(56) References Cited

U.S. PATENT DOCUMENTS

| | | | |
|---|---|---|---|
| 5,987,248 A * | 11/1999 | Murayama et al. | 717/125 |
| 6,493,868 B1 * | 12/2002 | DaSilva et al. | 717/105 |
| 6,587,967 B1 * | 7/2003 | Bates et al. | 714/35 |
| 6,611,276 B1 | 8/2003 | Muratori et al. | |
| 6,978,399 B2 * | 12/2005 | Bates et al. | 714/34 |
| 7,134,115 B2 * | 11/2006 | Kawai et al. | 717/124 |
| 2005/0066314 A1 * | 3/2005 | Bates et al. | 717/129 |
| 2005/0108689 A1 | 5/2005 | Hooper et al. | |
| 2005/0289514 A1 | 12/2005 | Hooper et al. | |

OTHER PUBLICATIONS

Practical Standards for Microsoft Visual Basic .NET by James Foxall Published by Microsoft Press Aug. 31, 2002.*
INTEL Corporation, "Intel IXP2400/IXP2800 Network Processor", Development Tools User's Guide, Jul. 2003, pp. 1-285.

* cited by examiner

*Primary Examiner*—Scott Baderman
*Assistant Examiner*—Joseph Schell
(74) *Attorney, Agent, or Firm*—Konrad Raynes & Victor LLP; David W. Victor

(57) ABSTRACT

Provided is a method, system, and program for navigating breakpoints in a program in a debugging mode. A user interface is rendered to display at least one program corresponding to at least one object file being executed in a debugging mode. A list is maintained of breakpoints in the at least one program. Code is rendered from one program including a selected first breakpoint. User input is received to access a second breakpoint and a selection is made from the list of the second breakpoint in one of the program. Code is rendered from one program including the selected second breakpoint

34 Claims, 9 Drawing Sheets

Breakpoint Entry

NAVIGATING BREAKPOINTS IN A PROGRAM IN A DEBUGGING MODE

BACKGROUND

Systems in a network environment communicate information in packets that encapsulate the information according to network communication protocols. Packets transmitted from one node to another node may be transmitted through one or more intervening routers that route the packets throughout the network or between networks. The router typically includes one or more network processors to process the packets. The network processor stores packets in a memory device, such as a Static Dynamic Random Access Memory (SDRAM) and stores packet management information, such as packet queues in a Static Random Access Memory (SRAM). The network processor may include a plurality of packet engines, also known as microengines. Each packet engine executes code, known as microcode, to perform a particular packet processing operations.

A developer writing microcode for the packet engines may use an integrated development tool to debug the code. The developer may create one or more source files that when compiled or assembled produce one or more list files. The developer may then assign each list file to a different packet engine. A linker converts the list files to executable microcode that is loaded by the microcode loader into a packet engine. The developer may then use a debugger function within an integrated development environment (IDE) tool to observe the list file code corresponding to the microcode being executed by the packet engines.

The user may set breakpoints in the source file or list file to debug the program. A breakpoint causes a halt in the execution of the code. A breakpoint set in the source or list file causes the execution to stop when the breakpoint is executed to allow the developer to observe how execution has proceeded up to that breakpoint. Breakpoints separate the program into sections to allow the developer to focus on those sections having problems, whereas sections between breakpoints that do not have problems can be bypassed. An example of an IDE tool used to develop code for network processor packet engines is described in the publication "Intel® IXP2400/IXP2800 Network Processor Development Tools User's Guide", order no. 278733-007 (Copyright Intel Corporation, July 2003)

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
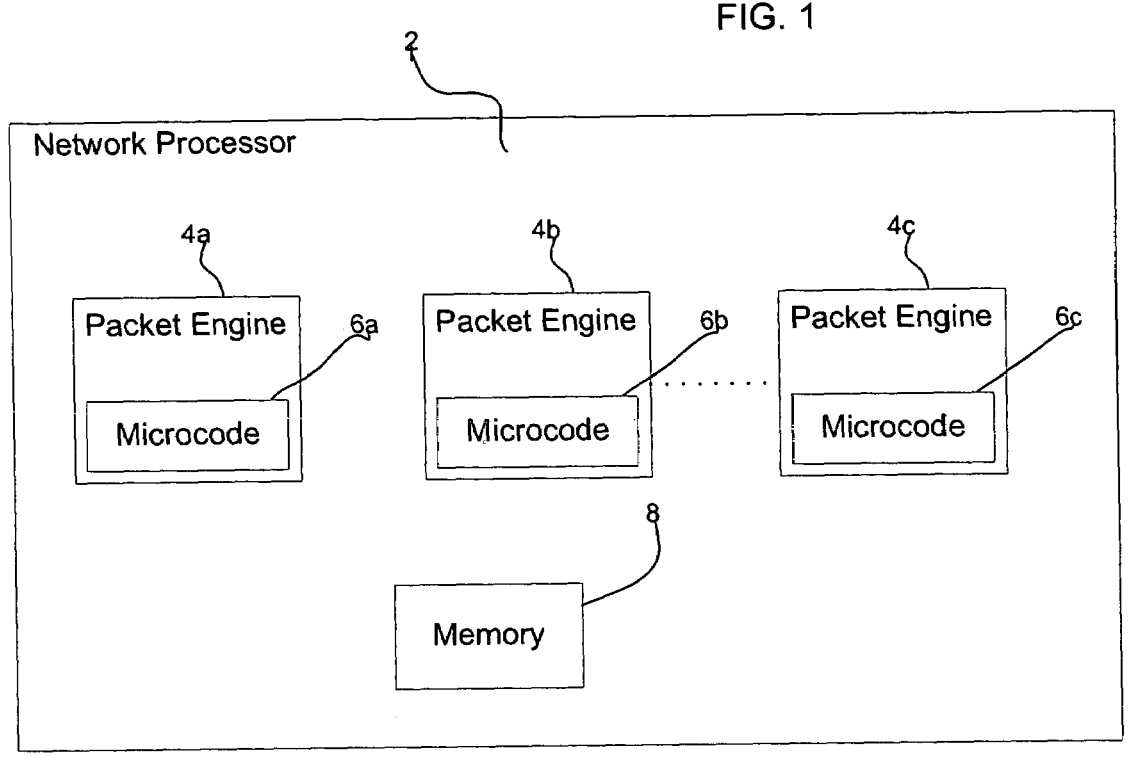
FIG. 1 illustrates a network processor.

A network processor comprises any device that executes programs to handle packets in a data network, such as processors on router line cards, network access equipment and packet forwarding devices. FIG. 1 illustrates one example of a network processor 2 including packet engines 4a, 4b . . . 4n comprising high speed processors specialized for packet processing. The packet engines 4a, 4b . . . 4n may comprise any programmable engine or processor for processing packets, such as a microengine, etc. The packet engines 4a, 4b . . . 4n may execute microcode 6a, 6b . . . 6n, such as microblocks, to process packets, where the microcode 6a, 6b . . . 6n comprises fast-path packet processing logic executed by the packet engines 4a, 4b . . . 4n. The packet engines 4a, 4b . . . 4n may instantiate multiple threads to execute different parts of the microcode 6a, 6b . . . 6n. The network processor 2 may include an on-board memory device 8 to store packets and other packet processing related information that is accessible to the packet engines 4a, 4b . . . 4n.

Figure 2:
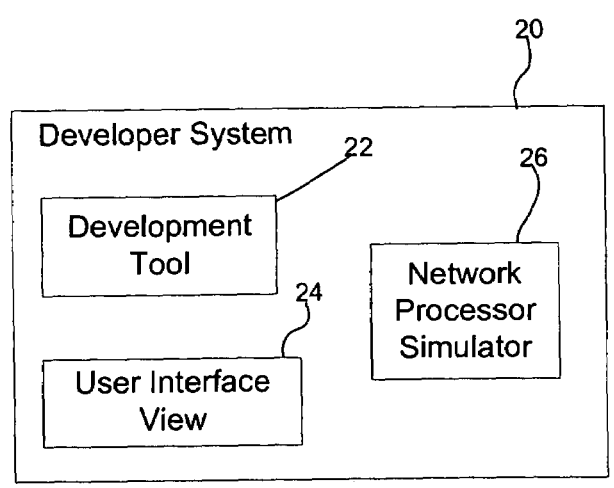
FIG. 2 illustrates a developer system.

FIG. 2 illustrates a developer computer system 20 that a programmer or developer creating microcode 4a, 4b . . . 4n may use, including a software development tool 22 to use to create, test and debug microcode and a user interface view 24 generated by the development tool 22 to enable the user to interface with the debugger program. A network processor simulator 26 may execute code being developed and tested using the development tool 22 and simulate the operation of one or more packet engines 4a, 4b . . . 4n, and the threads executing in each packet engine, on one or more network processors 26 executing the microcode in development. The developer may configure the network processor simulator 26 to set the parameters of the simulation environment, such as the clock frequencies of the packet engines, settings for memory devices 8 used by the network processor 6, such as clock frequency and byte size, bus settings, etc. The developer may further configure packet simulation parameters in the simulation environment that the simulated network processor processes using the microcode subject to the debugging operations.

Figure 3:
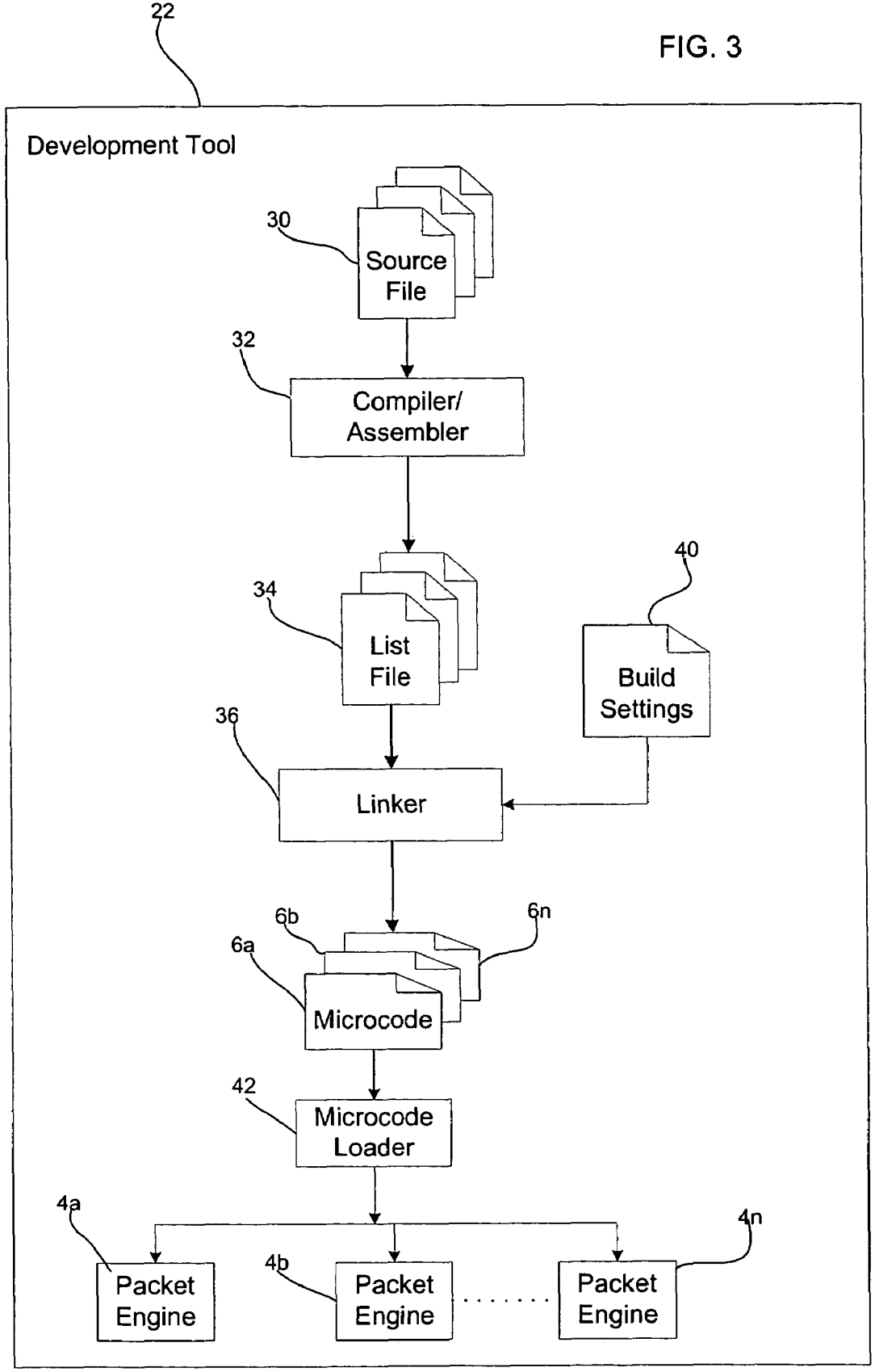
FIGS. 3 and 4 illustrate components within a development tool.

FIG. 3 illustrates programs and elements in the development tool 22 to perform microcode development related operations. Source files 30 include the source code for the microcode being developed. The source files 30 may be created in assembly language or Microengine C. The programs to create the source files 30 may be incorporated into the development tool 22. A compiler/assembler 32 program would translate the source files 30 into list files 34. The compiled or assembled list files 34 differ from the source code in that symbols may be replaced with actual values, instructions may be reordered for optimization, and the names of local registers are included. The list files 34 may be provided to a linker 36 program, which then translates the list files 34 into executable microcode 38 object files. In certain embodiments, the user may create build settings 40 to associate list files 34 with packet engines 4a, 4b . . . 4n, such that one list file 34 is associated with one packet engine 4a, 4b . . . 4n, so that the assigned packet engine 4a, 4b . . . 4n executes the microcode 6a, 6b . . . 6n generated from the list file indicated in the assignment. The microcode 6a, 6b . . . 6n generated from the list files 34 are loaded into the associated packet engines 4a, 4b . . . 4n and executed by threads in the packet engine 4a, 4b . . . 4n. A microcode loader 42 may load the generated microcode 6a, 6b . . . 6n into the appropriate packet engine 4a, 4b . . . 4n or simulated packet engine if the network processor simulator 26 is used. In this way, the build settings 40 are used to control how list files 34 and their corresponding microcode are assigned to packet engines 4a, 4b . . . 4n.

Figure 4:
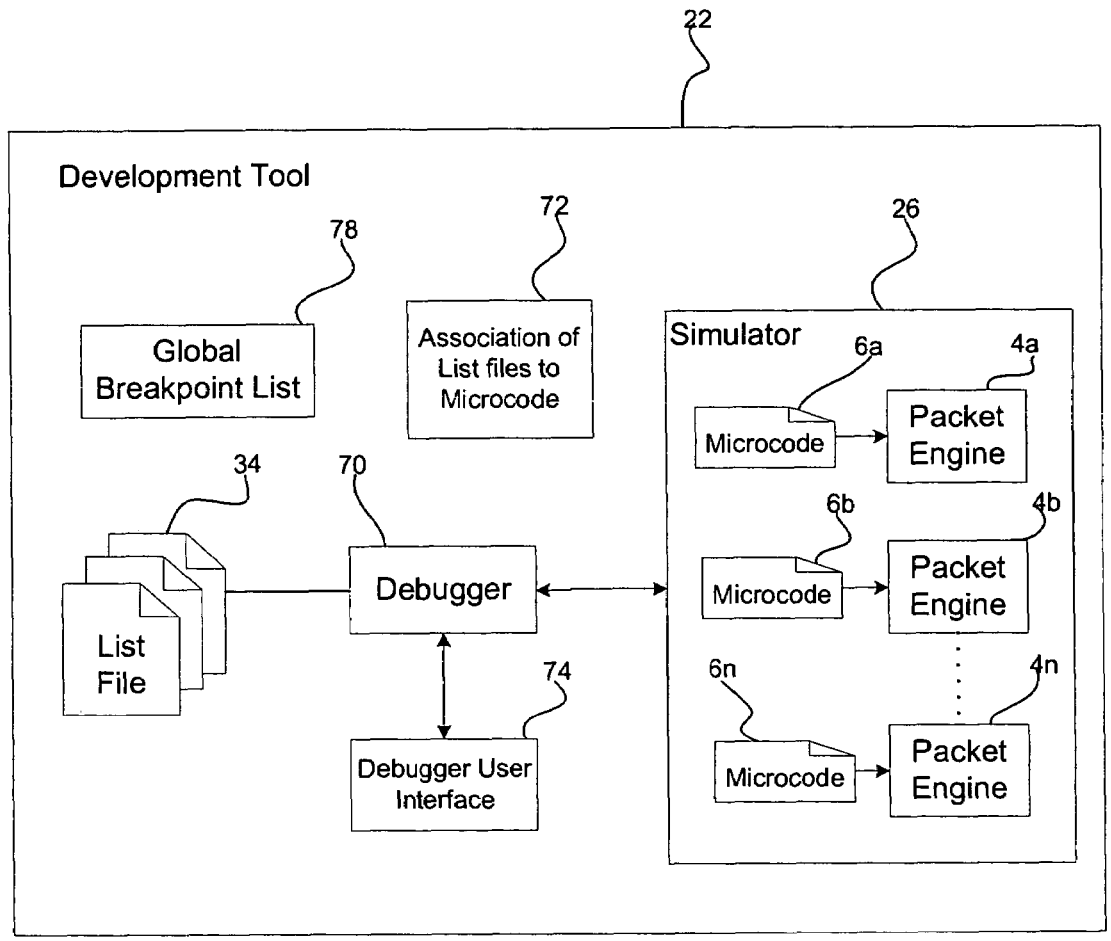

FIG. 4 illustrates components implemented in the development tool 22 to perform debugging related operations. The simulator 26 simulates packet engines 4a, 4b . . . 4n that launch threads to execute the microcode 6a, 6b . . . 6n generated from the list files 34. A debugger 70 is the program that enables a user to perform debugging related operations. The debugger 70 maintains an association 72 of list files 34 to the executable microcode 6a, 6b . . . 6n. This debugger 70 uses this association 72 to render in a debugger user interface 74 the code of the list files 34 corresponding to the microcode 6a, 6b . . . 6n being executed by simulated or real packet engines 4a, 4b . . . 4n. When viewing the list file 34 code in the debugger user interface 74, the developer may set breakpoints in the list file, which are used to stop execution at selected points in the code. Upon setting a breakpoint, the debugger 70 adds an entry to the global breakpoint list 78 including information on the breakpoint.

Figure 5:
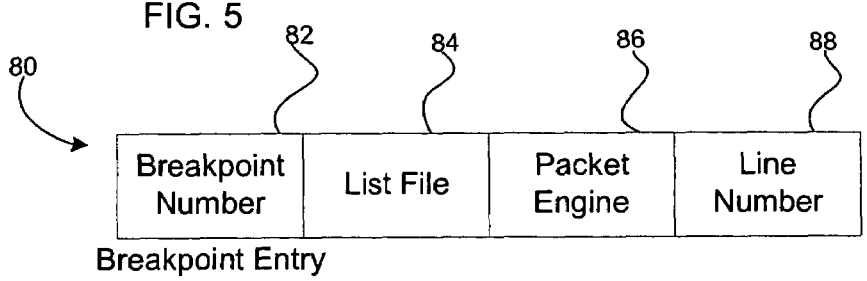
FIG. 5 illustrates information included in a breakpoint entry in a breakpoint list.

FIG. 5 illustrates information maintained in an entry 80 in the global breakpoint list 78 including a breakpoint number 82; the list file 84 in which the breakpoint is included; the packet engine 86 that executes the microcode generated from the list file 84; and a line number 86 on in the list file on which the breakpoint is set.

Figure 6:
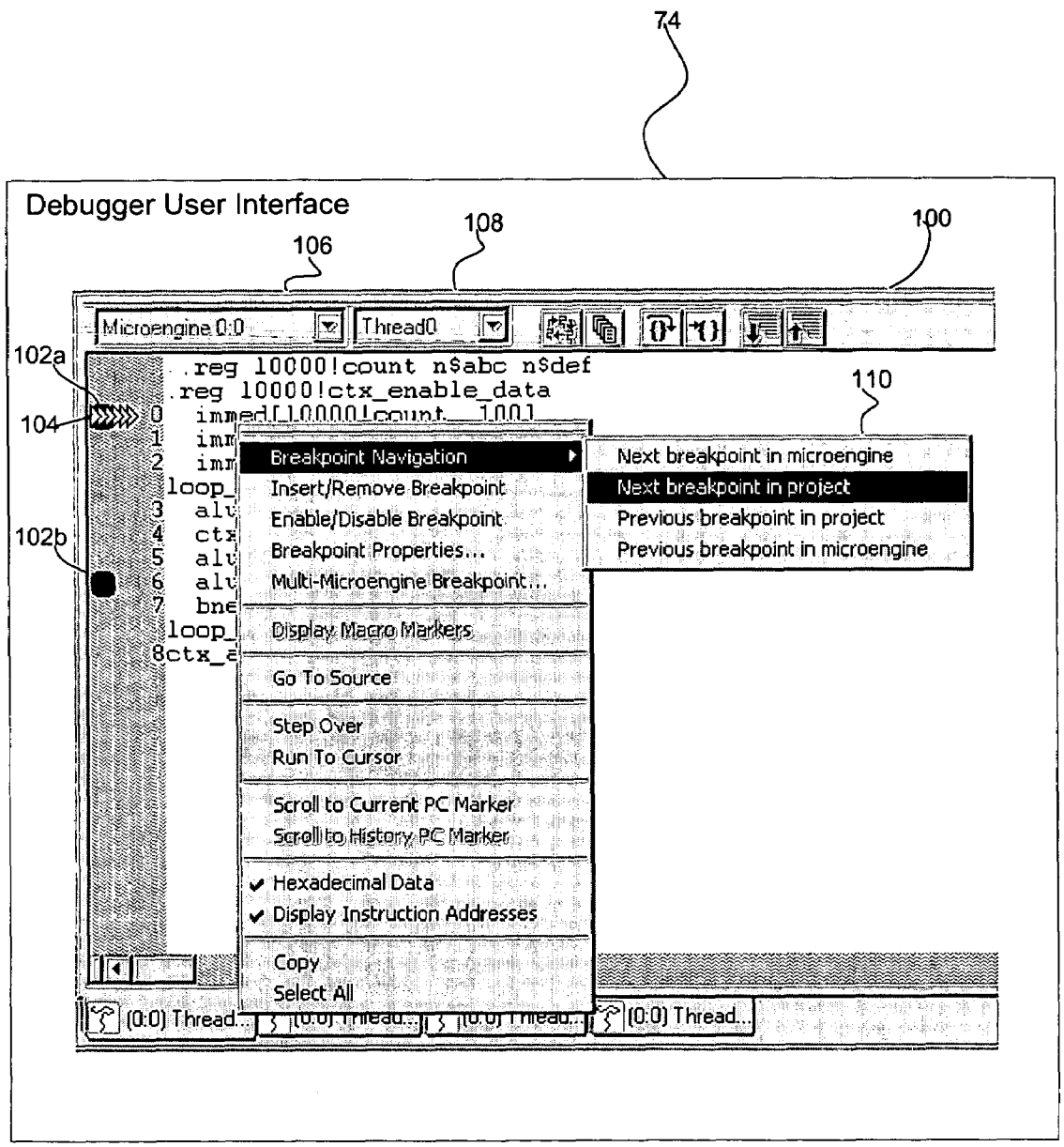
FIG. 6 illustrates a debugger user interface.

FIG. 6 illustrates a user interface panel 100 rendered in the debugger user interface 74. Breakpoint indicators 102a, 102b reference a breakpoint at a particular line in the code of the list file 34. An execution indicator 104 references a line of the compiled code whose corresponding executable code is currently being executed by a packet engine 4a, 4b . . . 4n in the simulator 26. The panel 100 includes a packet engine, i.e., microengine, drop down menu 106 to enable the developer to select a packet engine 4a, 4b . . . 4n to cause the debugger 70 to display the list file code corresponding to the microcode 6a, 6b . . . 6n executed by the selected packet engine 4a, 4b . . . 4n, e.g., microengine. A thread drop down menu 108 enables the display of that portion of the list file 34 including the list file code corresponding to the microcode being executed on the selected thread in the selected packet engine, i.e., microengine. In certain embodiments, the threads of one packet engine 4a, 4b . . . 4n execute the same microcode 6a, 6b . . . 6n generated from the same list file. The packet engines 4a, 4b . . . 4n may be ordered, where such ordering is indicated in the hardware, simulator 26, or software. A breakpoint navigation menu 110 enables the following listed breakpoint navigation operations:

Next breakpoint in microengine 112: the debugger 70 selects a next breakpoint in the list file being displayed in the panel 100 if there is a next breakpoint. If the current selected breakpoint is the last breakpoint in the list file, then the debugger 70 selects and displays the first breakpoint in the current list file being displayed.

Next breakpoint in project 114: the debugger 70 selects a next breakpoint in the list file being displayed in the panel 100 if there is a next breakpoint. If the current selected breakpoint is the last breakpoint in the list file, then the debugger 70 selects the first breakpoint in the list file corresponding to the microcode executed by a next packet engine 4a, 4b . . . 4n, i.e., microengine, according to a packet 4a, 4b . . . 4n ordering.

Previous breakpoint in project 116: the debugger selects a previous breakpoint in the list file being displayed in the panel 100 if there is a previous breakpoint. If the current selected breakpoint is the first breakpoint in the list file being displayed, then the debugger 70 selects and displays the last breakpoint in the list file corresponding to the microcode executed by a previous packet engine 4a, 4b . . . 4n, i.e., microengine, according to a packet 4a, 4b . . . 4n ordering.

Previous breakpoint in microengine 118: the debugger 70 selects a previous breakpoint in the list file being displayed in the panel 100 if there is a previous breakpoint. If the current selected breakpoint is the first breakpoint in the list file, then the debugger 70 selects and displays the last breakpoint in the current list file being displayed.

Figure 7:
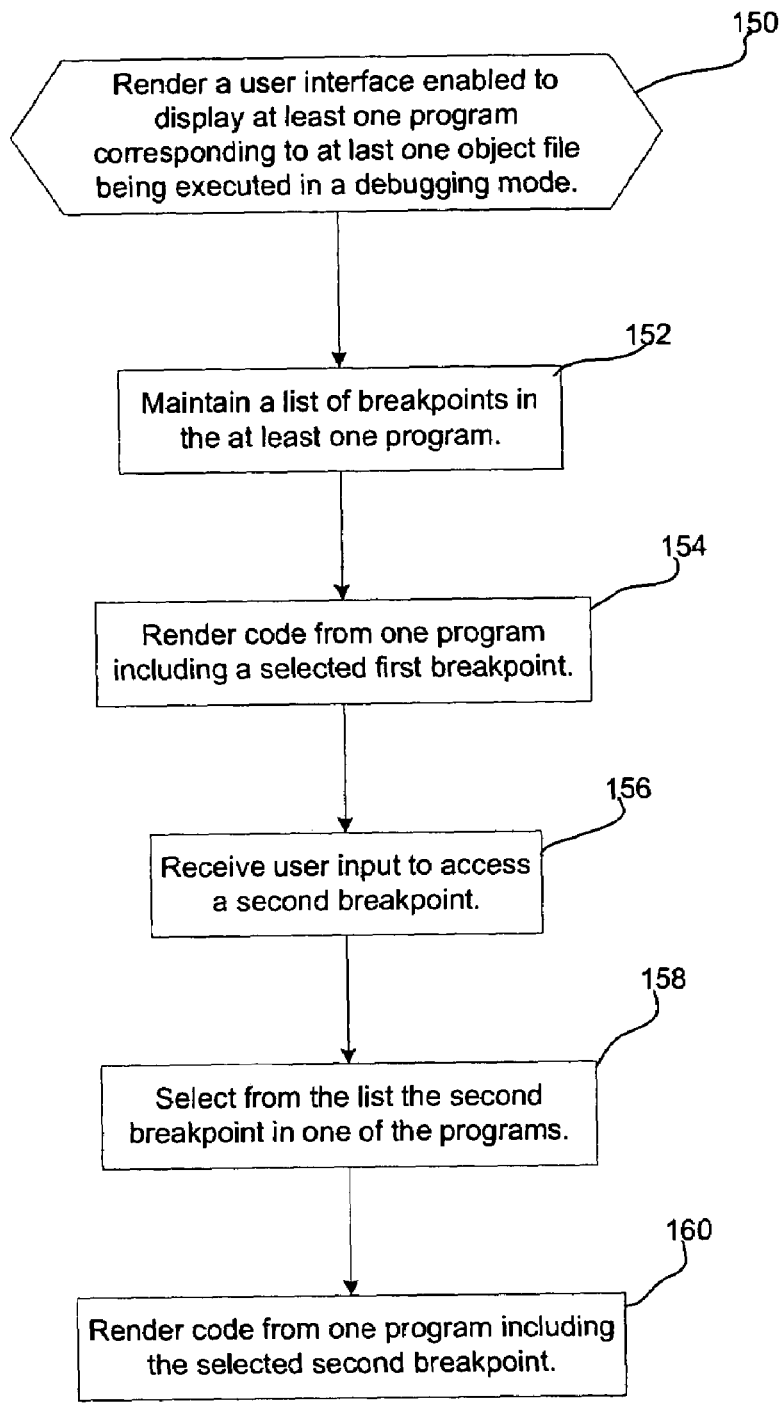
FIGS. 7, 8, and 9 illustrate operations performed by a debugger to enable navigation through breakpoints.
Figure 8:
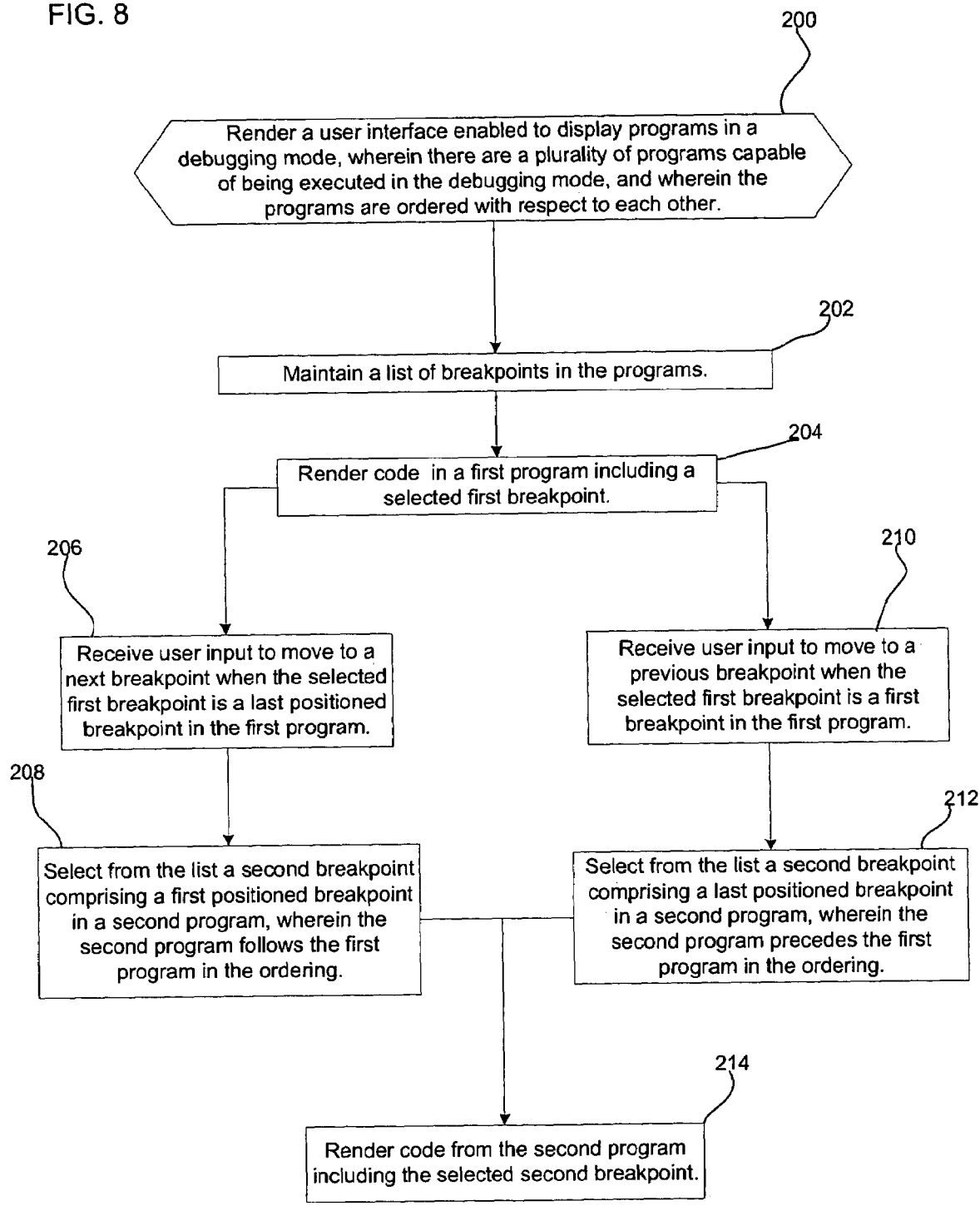
Figure 9:
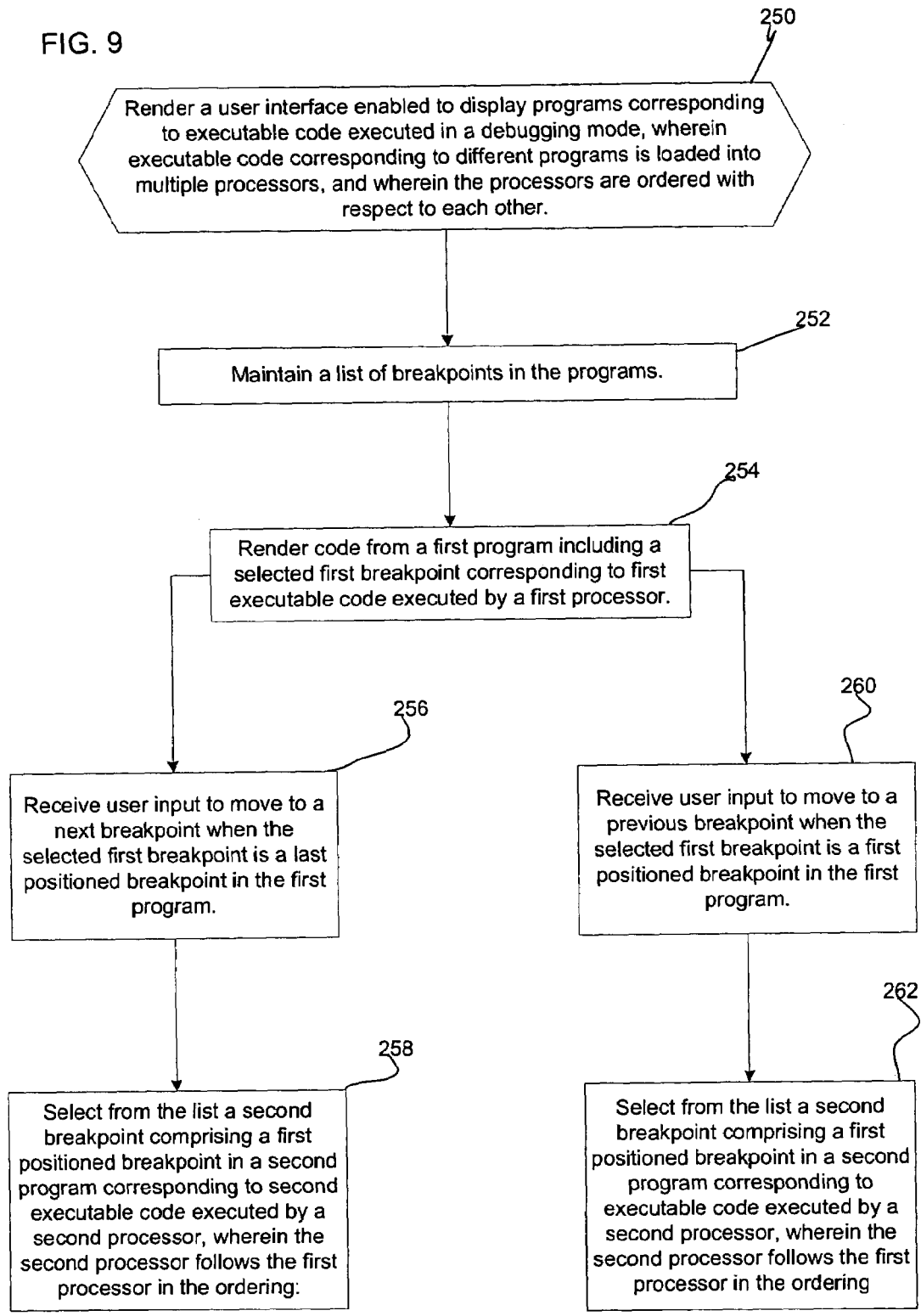

FIGS. 7, 8, and 9 illustrate operations to navigate through breakpoints, which may be performed by the debugger program 70 that is part of an integrated development tool, e.g., 22. With respect to FIG. 7, a user interface is rendered (at block 150) to display at least one program corresponding to at least one object file being executed in a debugging mode. As discussed, the displayed program may comprise compiled or assembled code corresponding to the object or executable code being executed, such as a list file. The code being executed may be executed by a simulator implementing a simulation environment of one or more processors, e.g., packet engines 4a, 4b . . . 4n, or be executed by actual processors, e.g., packet engines in a network processor, being monitored by the debugger. The debugger 70 maintains (at block 152) a list of breakpoints, e.g., global breakpoint list 78. The breakpoint list may include, such as shown in the breakpoint entry 80 of FIG. 5, the name of the program 84, e.g., list file, including the breakpoint, a line number 88, and a processor or packet engine 86 executing the executable code corresponding to the program including the breakpoint. The code from one program including a selected first breakpoint is rendered (at block 154). The code may be rendered in a user interface panel, such as the debugger user interface panel 100 (FIG. 6), that provides a breakpoint indicator, e.g., 102a, 102b of the breakpoint and execution indicator, e.g., 104, of the list file code currently executed. In response to receiving (at block 156) user input to access a second breakpoint, which may comprise a selected next or previous breakpoint, the debugger 70 selects (at block 158) from the list, e.g., 78, the second breakpoint in one of the programs, i.e., compiled list file programs. The debugger renders (at block 160) code from one program including the selected second breakpoint. The second breakpoint may be included in the program including the current code being rendered or in another program not rendered in a user interface.

FIG. 8 illustrates operations performed by a debugger, e.g., 78, debugging code in multiple programs, such as compiled programs, e.g., list files 34, that are executed by a simulated or real processor, e.g., packet engines, being monitored in debugging mode. The processors or packet engines may execute the programs, i.e., list files or compiled programs, assigned to that processor in different threads. The debugger 70 renders (at block 200) a user interface, e.g., 100 (FIG. 6), enabled to display programs, e.g., list file 84, being executed in a debugging mode, wherein there are a plurality of programs capable of being executed in the debugging mode. In certain embodiments, the programs, e.g., list files, or threads executing the list files are ordered with respect to each other. The program ordering may be dependent on the ordering of processors executing the programs, or some other ordering of the programs. The debugger, e.g., 70, maintains (at block 202) a list of breakpoints, e.g., 78, in the programs. Code from a first program, e.g., list file 34, including a selected first breakpoint is rendered (at block 204).

If the debugger receives (at block 206) user input to move to a next breakpoint when the selected first breakpoint is a last positioned breakpoint in the first program, then the debugger selects (at block 208) from the list a second breakpoint comprising a first positioned breakpoint in a second program, wherein the second program follows the first program in the ordering. In this way, the debugger automatically traverses breakpoints in different programs, such as the list files 34, being executed by the simulated or real processors, e.g., packet engines 4a, 4b . . . 4n, monitored by the debugger. In the navigation menu 110 in FIG. 6, control proceeds to a next breakpoint in the same or another list file 34 upon selecting the "next breakpoint" items form the menu.

If the debugger receives (at block 210) user input to move to a previous breakpoint when the selected first breakpoint is a first breakpoint in the first program, then the debugger selects (at block 212) from the list a second breakpoint comprising a last positioned breakpoint in a second program. The second program precedes the first program in the ordering. In the navigation menu 110 in FIG. 6, control proceeds to a previous breakpoint in the same or another list file 34 upon selecting the "next breakpoint" items form the menu. The code from the second program including the selected second breakpoint is rendered (at block 214).

FIG. 9 illustrates operations performed by a debugger 70 debugging code being executed by multiple processors, whether real or simulated, such as in the implementation of FIG. 4 where the debugger 70 monitors the execution of microcode 6a, 6b . . . 6n by multiple package engines 4a, 4b . . . 4n. The debugger 70 renders (at block 250) a user interface, e.g., 100 (FIG. 6), enabled to display programs corresponding to executable code in a debugging mode, wherein there are a plurality of programs capable of being executed in the debugging mode corresponding to executable code loaded into multiple processors, e.g., package engine 4a, 4b . . . 4n. The processors may be ordered with respect to each other. For instance, package engines 4a, 4b . . . 4n may have an ordering so that the debugger 70 can select among the packet engines 4a, 4b . . . 4n in the ordering. The debugger 70 maintains (at block 252) a list, such as the global breakpoint list 78, of breakpoints in the programs, e.g., list files 84. As discussed, the entries 80 (FIG. 5) in this breakpoint list may indicate a breakpoint number 82, a list file 84 or compiled program including the breakpoint, the packet engine 86 executing the code including the breakpoint, and the line number 88 in the list file 84 of the breakpoint. The debugger 78 renders (at block 254) code from a first program, e.g., list file 84, including a selected first breakpoint, wherein the first program corresponds to executable code, e.g., microcode 6a, 6b . . . 6n, executed by a first processor, e.g., packet engine 4a, 4b . . . 4n. The list file may be executed by a particular thread in the first processor. The processor, e.g., packet engine, executing the code may comprise a simulated processor or a real processor.

If the debugger 70 receives (at block 256) user input to move to a next breakpoint when the selected first breakpoint is a last positioned breakpoint in the first program, then the debugger selects (at block 208) from the list a second breakpoint comprising a first positioned breakpoint in a second program corresponding to second executable code executed by a second processor, where the second processor follows the first processor in the ordering. In the embodiment of FIG. 6, the input to move to a next breakpoint in another program, e.g., list file, executed by another processor, e.g., packet engine, is provided upon selection of the "next breakpoint in project" command in the breakpoint navigation menu 110 (FIG. 6).

If (at block 260) the debugger, e.g., 70, receives user input to move to a previous breakpoint when the selected first breakpoint is a first breakpoint in the first program, then the debugger selects (at block 262) from the list a second breakpoint comprising a last positioned breakpoint in the second program, where the second program precedes the first program in the ordering. The code from the second program including the selected second breakpoint is rendered, such as in the debugger user interface 100. In the embodiment of FIG. 6, the input to move to a previous breakpoint in another program, e.g., list file, executed by another processor, e.g., packet engine, is provided upon user selection of the "previous breakpoint in project" command in the breakpoint navigation menu 110 (FIG. 6).

Figure 10:
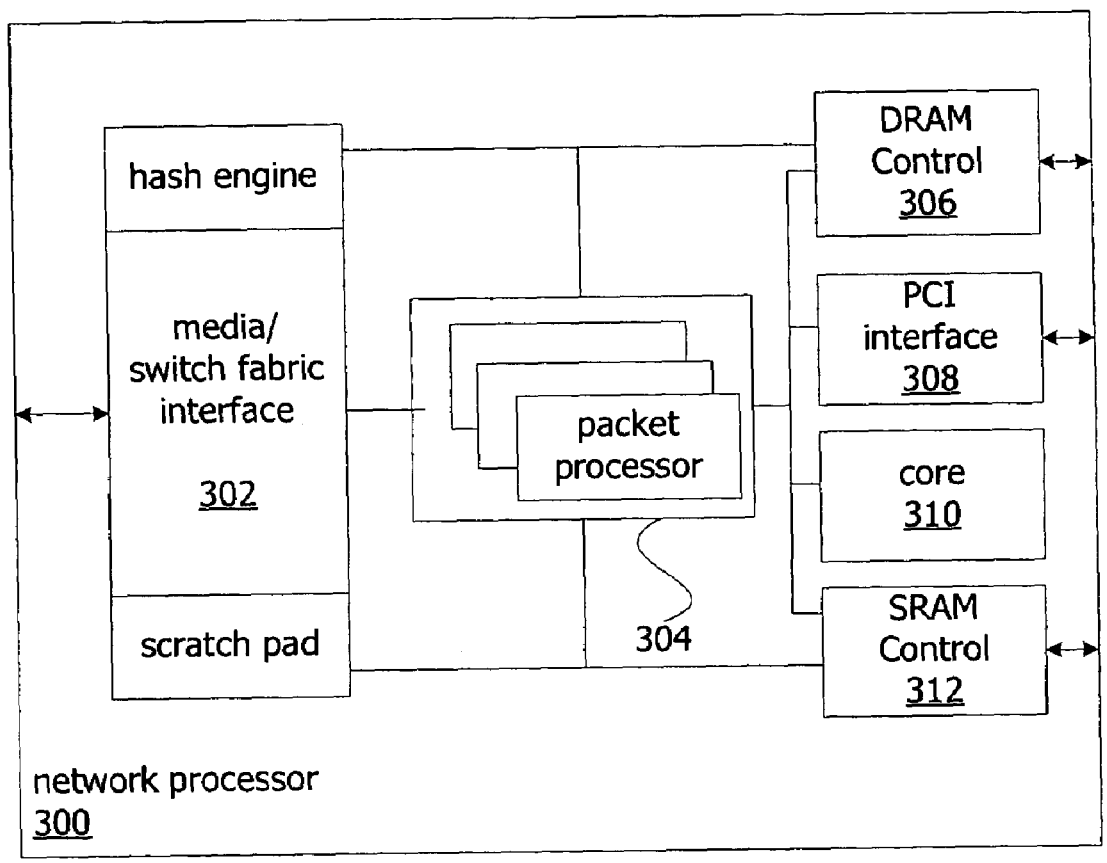
FIG. 10 is a diagram of a network processor.

FIG. 10 illustrates an example of a network processor 300. The network processor 300 shown is an Intel® Internet eXchange network Processor (IXP). Other network processors feature different designs. The network processor 300 shown features a collection of packet engines 304, also known as microengines programmable engines, etc. The packet engines 304 may be Reduced Instruction Set Computing (RISC) processors tailored for packet processing. For example, the packet engines 304 may not include floating point instructions or instructions for integer multiplication or division commonly provided by general purpose processors. The network processor 300 components may be implemented on a single integrated circuit die.

An individual packet engine 304 may offer multiple threads. For example, the multi-threading capability of the packet engines 304 may be supported by hardware that reserves different registers for different threads and can quickly swap thread contexts. In addition to accessing shared memory, a packet engine may also feature local memory and a content addressable memory (CAM). The packet engines 304 may communicate with neighboring processors 304, for example, using neighbor registers wired to the adjacent engine(s) or via shared memory.

The network processor 300 also includes a core processor 310 (e.g., a StrongARM® XScale®) that is often programmed to perform "control plane" tasks involved in network operations. (StrongARM and XScale are registered trademarks of Intel Corporation). The core processor 310, however, may also handle "data plane" tasks and may provide additional packet processing threads.

As shown, the network processor 300 also features interfaces 302 that can carry packets between the processor 300 and other network components. For example, the processor 300 can feature a switch fabric interface 302 (e.g., a CSIX interface) that enables the processor 300 to transmit a packet to other processor(s) or circuitry connected to the fabric. The processor 300 can also feature an interface 302 (e.g., a System Packet Interface Level 4 (SPI-4) interface) that enables to the processor 300 to communicate with physical layer (PHY) and/or link layer devices. The processor 300 also includes an interface 308 (e.g., a Peripheral Component Interconnect (PCI) bus interface) for communicating, for example, with a host. As shown, the processor 300 also includes other components shared by the engines such as memory controllers 306, 312, a hash engine, and scratch pad memory.

Figure 11:
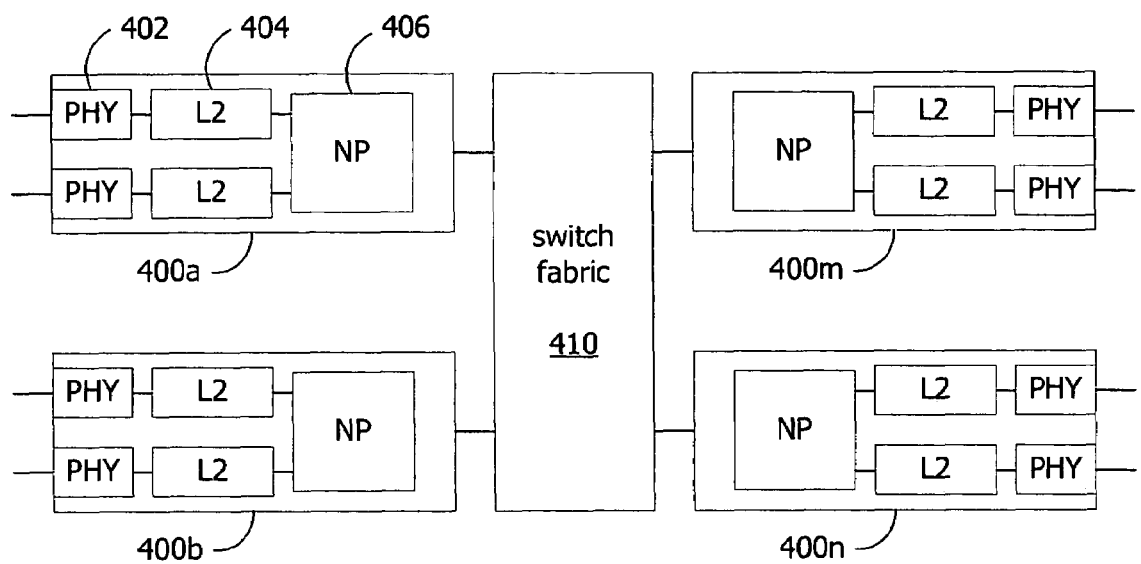
FIG. 11 is a diagram of a network device.

FIG. 11 depicts a network device incorporating techniques described above. As shown, the device features a collection of line cards 400 ("blades") interconnected by a switch fabric 410 (e.g., a crossbar or shared memory switch fabric). The switch fabric, for example, may conform to CSIX or other fabric technologies such as HyperTransport, Infiniband, PCI-X, Packet-Over-Synchronous Optical Network (SONET), RapidIO, and Utopia. CSIX is described in the publication "CSIX-L1: Common Switch Interface Specification-L1", Version 1.0, published August, 2000 by CSIX; HyperTransport is described in the publication "HyperTransport I/O Link Specification", Rev. 1.03, published by the HyperTransport Tech. Consort., October, 2001; InfiniBand is described in the publication "InfiniBand Architecture, Specification Volume 1", Release 1.1, published by the InfiniBand trade association, November 2002; PCI-X is described in the publication PCI-X 2.0 Specification by PCI-SIG; SONET is described in the publication "Synchronous Optical Network (SONET)-Basic Description including Multiplex Structure, Rates and Formats," document no. T1X 1.5 by ANSI (Jan. 2001); RapidIO is described in the publication "RapidIO Interconnect Specification", Rev. 1.2, published by RapidIO Trade Ass'n, June 2002; and Utopia is described in the publication "UTOPIA: Specification Level 1, Version 2.01", published by the ATM Forum Tech. Comm., Mar., 1994.

Individual line cards (e.g., 400a) include one or more physical layer (PHY) devices 402 (e.g., optic, wire, and wireless PHYs) that handle communication over network connections. The PHYs translate between the physical signals carried by different network mediums and the bits (e.g., "0"-s and "1"-s) used by digital systems. The line cards 400 may also include framer devices (e.g., Ethernet, Synchronous Optic Network (SONET), High-Level Data Link (HDLC) framers or other "layer 2" devices) 404 that can perform operations on frames such as error detection and/or correction. The line cards 400 shown also include one or more network processors 406 or integrated circuits (e.g., ASICs) that perform packet processing operations for packets received via the PHY(s) 400 and direct the packets, via the switch fabric 410, to a line card providing the selected egress interface. Potentially, the network processor(s) 406 may perform "layer 2" duties instead of the framer devices 404 and the network processor operations described herein.

While FIGS. 1, 10 and 11 describe a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, the debugger was used to monitor and debug the execution of code by one or more packet engines, e.g., microengines of a network processor. In additional embodiments, the debugger operations to view breakpoints may perform debugging operations with respect to the execution of code by different types of processors, including central processing units, Input/Output controllers, storage controllers, video controllers, etc. Further, the debugging operations to navigate breakpoint may be performed with respect to a single programmable processor executing code corresponding to one or more programs.

In the described embodiments, a GUI type interface was used to allow the user to navigate to a next or previous breakpoint. In alternative embodiments, the user may use keyboard commands to invoke the breakpoint navigation operations.

The list file may comprise compiled or translated file, or flat files, initially coded in programming languages known in the art, including C, assembly language, etc. In yet alternative embodiments, the code from the source file corresponding to the code being executed may be displayed in the debugger user interface, instead of a compiled or translated program, e.g., the list file 34.

In described embodiments, the microcode is executed by packet engines in a simulated execution environment. In alternative embodiments, the debugger program may monitor the execution of the microcode by actual packet engines in a network processor test device.

The term packet was sometimes used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc. In such alternative implementations, the key from the header for such alternative packets may include information that is not related to the transmission of a packet over a network.

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

The illustrated operations of FIGS. 7, 8, and 9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
rendering a user interface enabled to display programs corresponding to executable code executed by multiple processors in a debugging mode;
maintaining a list of breakpoints in the programs;
rendering code from a first program including a selected first breakpoint, wherein the first program corresponds to first executable code assigned to and executed by a first processor;
receiving user input to access a second breakpoint in a second program corresponding to second executable code assigned to and executed by a second processor, wherein the first executable code and second executable code are only executed by the processor to which each is assigned;
selecting from the list the second breakpoint in the second program; and
rendering code from the second program including the selected second breakpoint.

2. The method of claim 1, wherein the second breakpoint comprises a next or previous breakpoint in the list in relation to the first breakpoint.

3. The method of claim 1, wherein the programs are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second program follows the first program in the ordering.

4. The method of claim 1, wherein the programs are ordered with respect to each other, wherein the received user input indicates to move to a previous breakpoint when the selected first breakpoint is a first positioned breakpoint in the first program, wherein the second breakpoint selected from the list comprises a last positioned breakpoint in the second program, wherein the second program precedes the first program in the ordering in response to the user selecting.

5. The method of claim 1, wherein the first and second processors are capable of executing the first and second executable code, respectively, concurrently in debugging mode.

6. The method of claim 1, wherein the first and second processors executing the first and second executable code comprise simulated processors executing in a simulator.

7. The method of claim 1, wherein the processors are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second processor follows the first processor in the ordering.

8. The method of claim 1, wherein the processors are ordered with respect to each other, wherein the received user input indicates to move to a previous breakpoint when the selected first breakpoint is a first positioned breakpoint in the first program, wherein the second breakpoint selected from the list comprises a first positioned breakpoint in the second program, and wherein the second processor follows the first processor in the ordering.

9. The method of claim 1, wherein the processors comprise packet engines to perform packet processing related operations, wherein the first and second executable code comprises first and second microcode files, wherein the first and second programs comprise compiled list files, and wherein a plurality of threads executing in each packet engine are capable of executing the list file corresponding to the microcode executed by the packet engine.

10. The method of claim 1, wherein the list indicates for each breakpoint a line in the program for which the breakpoint was set and a packet engine that is assigned to execute the object code corresponding to the program including the breakpoint.

11. The method of claim 1, wherein the program comprises a compiled program.

12. A system, comprising:
an output device;
a first and second processors;
a computer readable medium;
at least one program in the computer readable medium
at least one object file in the computer readable medium corresponding to the at least one program;
a debugger in communication with the output device and memory and enabled to:
render a user interface in the output device enabled to display programs corresponding to executable code executed in a debugging mode;
maintain in the computer readable medium a list of breakpoints in the programs;
render code from a first program including a selected first breakpoint, wherein the first program corresponds to first executable code assigned to and executed by the first processor;
receive user input to access a second breakpoint in a second program corresponding to a second executable code assigned to and executed by the second processor, wherein the first executable code and the second executable code are only executed by the processor to which each is assigned;
select from the list the second breakpoint in the second program; and
render code from the second program including the selected second breakpoint.

13. The system of claim 12, wherein the second breakpoint comprises a next or previous breakpoint in the list in relation to the first breakpoint.

14. The system of claim 12, wherein the programs are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second program follows the first program in the ordering.

15. The system of claim 12, wherein the programs are ordered with respect to each other, wherein the received user input indicates to move to a previous breakpoint when the selected first breakpoint is a first positioned breakpoint in the first program, wherein the second breakpoint selected from the list comprises a last positioned breakpoint in the second program, wherein the second program precedes the first program in the ordering in response to the user selecting.

16. The system of claim 12, wherein the first and second processors are capable of executing the first and second executable code, respectively, concurrently in debugging mode.

17. The system of claim 12, wherein the first and second processors executing the first and second executable code comprise simulated processors executing in a simulator.

18. The system of claim 12, wherein the processors are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second processor follows the first processor in the ordering.

19. The system of claim 12, wherein the processors are ordered with respect to each other, wherein the received user input indicates to move to a previous breakpoint when the selected first breakpoint is a first positioned breakpoint in the first program, wherein the second breakpoint selected from the list comprises a first positioned breakpoint in the second program, and wherein the second processor follows the first processor in the ordering.

20. The system of claim 12, wherein the list indicates for each breakpoint a line in the program for which the breakpoint was set and a packet engine that is assigned to execute the object code corresponding to the program including the breakpoint.

21. The system of claim 12, wherein the program comprises a compiled program.

22. A system, comprising:
a plurality of packet engines enabled to perform packet processing related operations;
an output device;
a compute readable medium;
at least one microcode file;
at least one compiled list file corresponding to microcode in the computer readable medium;
a memory;
circuitry in communication with the output device, the memory, and the packet engines, and enabled to:
render a user interface in the output device enabled to display list files corresponding to executable microcode being executed in a debugging mode by the packet engines;
maintain in the computer readable medium a list of breakpoints in the list files;
render code from a first list file including a selected first breakpoint, wherein the first list file corresponds to first executable microcode assigned to and executed by a first packet engine;
receive user input to access a second breakpoint in a second list file corresponding to second executable microcode assigned to and executed by a second packet engine, wherein the first executable microcode and the second executable microcode are only executed by the packet engine to which each is assigned;
select from the list the second breakpoint in the second list file; and
render code from the list file including the selected second breakpoint.

23. The system of claim 22, further comprising:
a simulator, wherein the packet engines executing the microcode comprises simulated packet engines executing in the simulator.

24. An article of manufacture comprising a computer readable storage medium having executable code for debugging at least one program corresponding to at least one object file and for performing operations comprising:
rendering a user interface enabled to display programs corresponding to executable code executed in a debugging mode;
maintaining a list of breakpoints in the programs;
rendering code from a first program including a selected first breakpoint, wherein the first program corresponds to first executable code assigned to and executed by a first processor;
receiving user input to access a second breakpoint in a second program corresponding to second executable code assigned to and executed by a second processor, wherein the first executable code and the second executable code are only executed by the processor to which each is assigned;
selecting from the list the second breakpoint in the second program; and
rendering code from the second program including the selected second breakpoint.

25. The article of manufacture of claim 24, wherein the second breakpoint comprises a next or previous breakpoint in the list in relation to the first breakpoint.

26. The article of manufacture of claim 24, wherein the programs are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second program follows the first program in the ordering.

27. The article of manufacture of claim 24, wherein the programs are ordered with respect to each other, wherein the received user input indicates to move to a previous breakpoint when the selected first breakpoint is a first positioned breakpoint in the first program, wherein the second breakpoint selected from the list comprises a last positioned breakpoint in the second program, wherein the second program precedes the first program in the ordering in response to the user selecting.

28. The article of manufacture of claim 24, wherein the first and second processors are capable of executing the first and second executable code, respectively, concurrently in debugging mode.

29. The article of manufacture of claim 24, wherein the first and second processors executing the first and second executable code comprise simulated processors executing in a simulator.

30. The article of manufacture of claim 24, wherein the processors are ordered with respect to each other, wherein the received user input indicates to move to a next breakpoint when the selected first breakpoint is a last positioned breakpoint in the first program, wherein the second breakpoint selected from the list comprises a first positioned breakpoint in the second program, wherein the second processor follows the first processor in the ordering.

31. The article of manufacture of claim 24, wherein the processors are ordered with respect to each other, wherein the received user input indicates to move to a previous breakpoint when the selected first breakpoint is a first positioned breakpoint in the first program, wherein the second breakpoint selected from the list comprises a first positioned breakpoint in the second program, and wherein the second processor follows the first processor in the ordering.

32. The article of manufacture of claim 24, wherein the processors comprise packet engines to perform packet processing related operations, wherein the first and second executable code comprises first and second microcode files, wherein the first and second programs comprise compiled list files, and wherein a plurality of threads executing in each packet engine are capable of executing the list file corresponding to the microcode executed by the packet engine.

33. The article of manufacture of claim 24, wherein the list indicates for each breakpoint a line in the program for which the breakpoint was set and a packet engine that is assigned to execute the object code corresponding to the program including the breakpoint.

34. The article of manufacture of claim 24, wherein the program comprises a compiled program.

* * * * *